Nov. 27, 1951  B. F. EDWARDS  2,576,581
POLYFOCAL SPECTACLE
Filed July 9, 1946  3 Sheets-Sheet 1
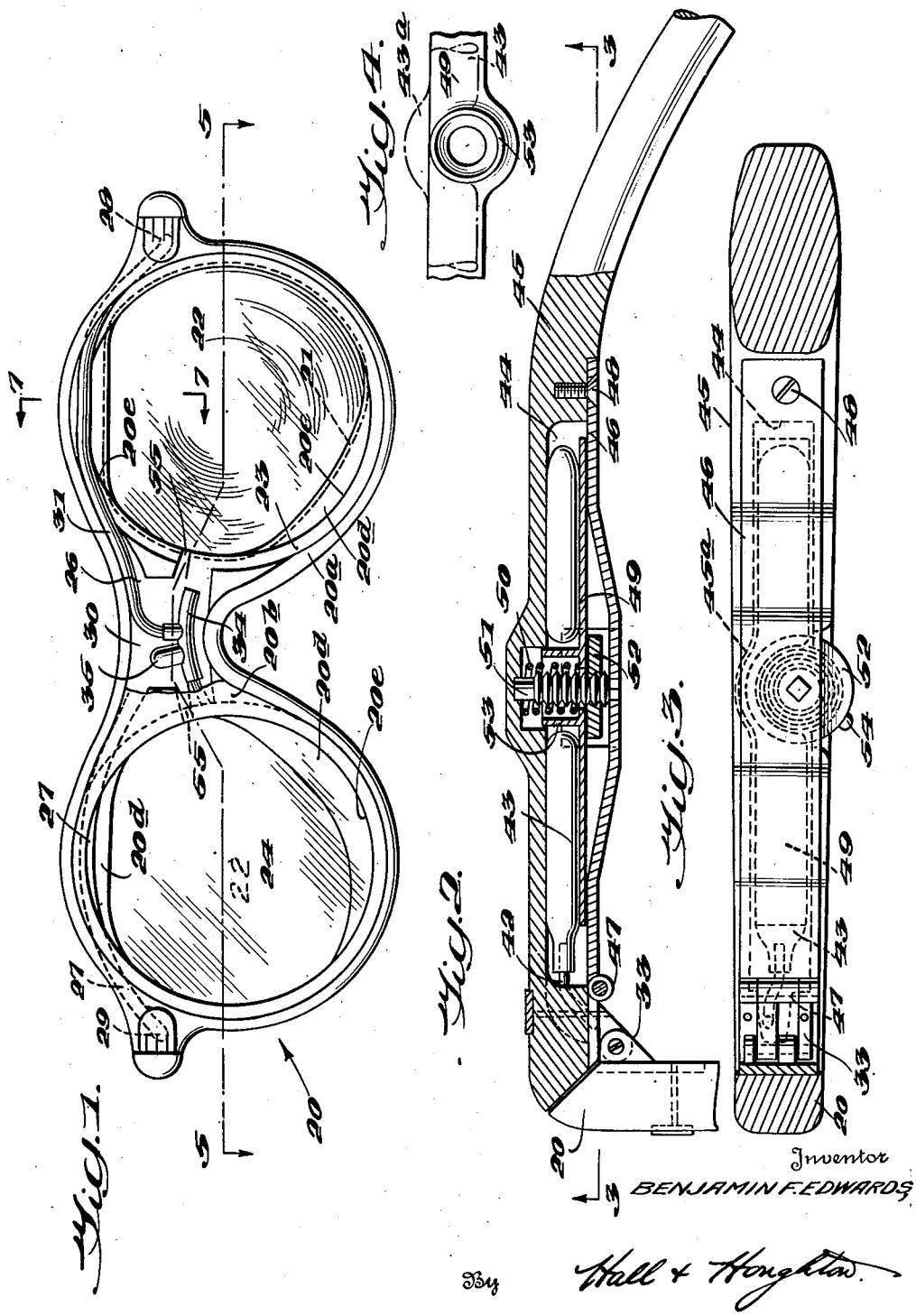
Inventor
BENJAMIN F. EDWARDS

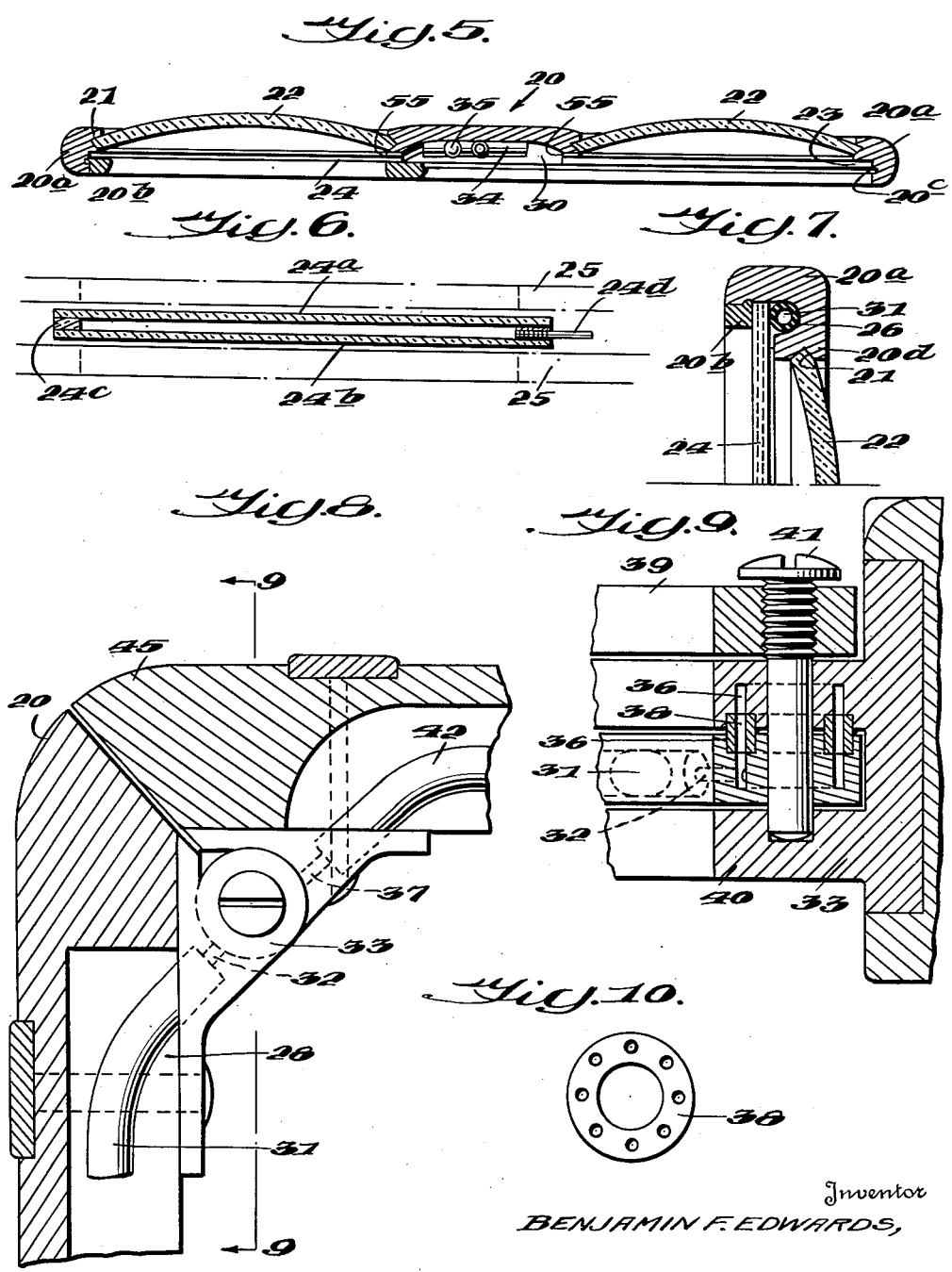

Nov. 27, 1951     B. F. EDWARDS     2,576,581
POLYFOCAL SPECTACLE
Filed July 9, 1946     3 Sheets-Sheet 3
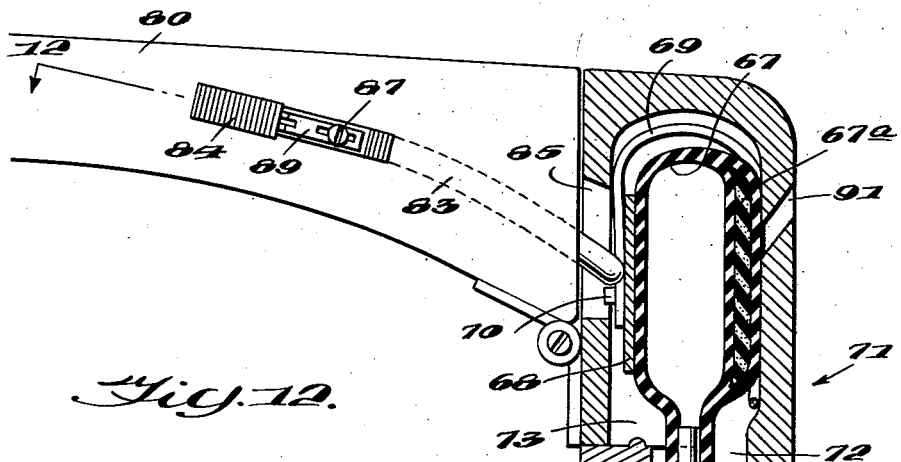
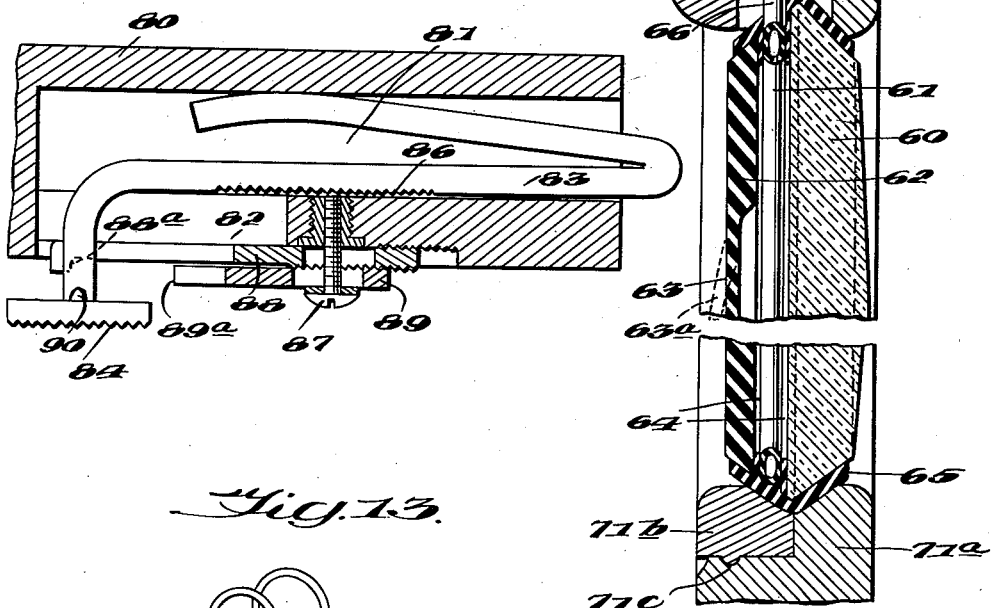
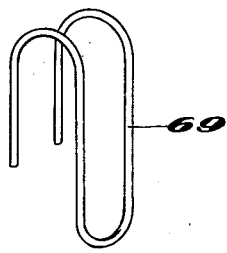
Inventor
BENJAMIN F. EDWARDS,
By Hall & Houghton
Attorneys Patented Nov. 27, 1951

2,576,581

UNITED STATES PATENT OFFICE 2,576,581

POLYFOCAL SPECTACLES

Benjamin F. Edwards, Mojave, Calif.

Application July 9, 1946, Serial No. 682,342

3 Claims. (Cl. 88—41)

This invention relates to spectacles, and has for its object the provision of an efficient polyfocal spectacle of simple and convenient construction and arrangement of parts.

The invention consists in the combinations and arrangements hereinafter described and claimed.

In the accompanying drawings of illustrative embodiments of the invention:

Fig. 1 is a rear elevation of one form of spectacle with parts omitted for clarity.

Fig. 2 is a plan view partly in section of a temple bar cooperative with Fig. 1.

Fig. 3 is a longitudinal section taken from the line 3—3 of Fig. 2 in the direction of the arrows.

Fig. 4 is a fragmentary detail from within of the presser plate of Fig. 2, with the overlying sac shown in dotted lines.

Fig. 5 is a broken longitudinal section taken from the line 5—5 of Fig. 1, in the direction of the arrows.

Fig. 6 is an enlarged detail showing diagrammatically one mode of assembling the variable diopter lens of Fig. 1.

Fig. 7 is a vertical cross section taken on the line 7—7 of Fig. 1 in the direction of the arrows.

Fig. 8 is an enlarged detail plan of the hinge and fluid connection of Figs. 1 and 2.

Fig. 9 is an enlarged detailed section taken from the line 9—9 of Fig. 8 in the direction of the arrows.

Fig. 10 is a detail plan of the packing ring of Fig. 9.

Fig. 11 is a plan view partly in section of a half-spectacle embodying a modified form of the invention.

Fig. 12 is an enlarged detailed section through the operator of Fig. 11, taken on the line 12 as indicated.

Fig. 13 is an enlarged detail of the expander of Fig. 11.

As is well known, spectacles are provided for the purpose of correcting for near sightedness, far sightedness and astigmatism, conditions determined by the structure of the eye and subject to but very slow, if any change, over periods of a number of years. In addition, as is well known, at the age of about 42 years the eye commences markedly to lose its ability to accommodate, i. e. to be able to focus clearly objects only a few inches from the eye and objects remote therefrom by twenty feet or more.

Heretofore resort has been had to alternatively used spectacles, bifocals, or even tri-focals, to provide alternative lens systems for viewing the objective in reading at say 18 inches, distance vision at say 20 feet or more, and special distance work, for example, the reading of music at 30 inches.

As has been known for many years, the use of such alternative lens systems is inadequate. Substitute spectacles are a nuisance. Bifocals and tri-focals require that the user tilt his head to ungainly angles and peer through little windows for special purposes, and thus tend to irritate and embarrass the user. Furthermore, these makeshifts completely fail to equip the user for unusual circumstances. Thus a man with bifocals suitable for reading and distance vision cannot see adequately to make adjustments under the dash-board of an automobile, for example, where his eyes cannot be positioned as say, more than nine inches from the work. These and other difficulties of those suffering from lack of accommodation are well known, but no simple, effective, and inconspicuous means has been developed for satisfactorily solving this problem prior to the present invention.

In the form of the present invention shown in Figs. 1–10, there is provided a poly-focal spectacle differing little in appearance from an ordinary heavy horn-rimmed spectacle, embodying the basic corrections required by a particular individual, and further embodying means variable at will to compensate for lack of accommodation of his eyes, for bringing into focus objects at any and all distances from the user ranging from a few inches to infinity, i. e. twenty feet or more.

In this form of the invention the spectacle, as usual, comprises a frame of suitable material, as metal or plastic for example, having a lens mounting portion and temple bars hingedly secured thereto. In this case, however, the lens mounting portion 20 of the frame comprises two pairs of lens channels spaced from one another, the first pair 21 receiving in any usual or desired manner the basic prescription lenses 22, which are preferably of toric form as shown, and the second set of channels 23 receiving a special pair of variable diopter lenses, adapted to be expanded or contracted by means under control of the user and conveniently and inconspicuously housed in the spectacle frame itself.

In the form shown the lens mounting portion of the frame 20 (Figs. 1, 5 and 7), is formed of two separable sections 20a and 20b, the front section 20a having its margins extending beyond the margins of the rear section 20b so that the rear section (partially broken away in Figs. 1 and 5) may be assembled within the margins of the front section and be virtually concealed thereby. In the form shown, as indicated at 20c, the rear section 20b is provided with a marginal snap-in bead, and the front section with a groove to retainingly engage the bead to removably secure the parts together, the natural flexibility of these frame sections allowing the externally beaded section 20b to be snapped into the internally grooved seat of the section 20a. The variable diopter lens securing channel 23 is provided between the two snapped together sections which may be separated, as by prying apart, for insertion and removal of the variable diopter lenses when desired.

As is hereinafter explained, the lenses may be of various styles and shapes, but in accordance with the present vogue the basic prescription lenses 22 are preferably of toric form and of noncircular shape, while the variable diopter lenses 24, in this form, are preferably flat lenses of circular shape, as is well indicated in Fig. 1. To properly support these lenses, the frame portion 20a, as is best shown in Fig. 7, has its basic lens channel 21 formed in a correspondingly shaped web 20d spaced from its annular variable diopter lens supporting shoulder 20e (Fig. 1) to avoid contact with the face of the variable diopter lens 24.

The variable diopter lens in this form (see Fig. 6) preferably comprises two thin elastic sheets 24a and 24b of transparent plastic, as methyl methacrylate plastic, polystyrene, or other suitable material, such plastic being of a character having inherent elasticity or including in its composition a plasticizer imparting elasticity without interference with transparency. Such plasticizers are well known to the plastics art and any suitable selection of material may be made without departing from this invention.

The sheets 24a and 24b are suitably assembled with a spacer ring 24c of plastic or other suitable material in which is assembled a conduit, tit or hollow needle 24d of metal or of plastic construction, which may be ribbed as shown to afford a perfect bond. This assembly is preferably made by adhesive or welding of the parts into an integral whole. For example, as indicated in Fig. 6, where thermoplastic adhesion is employed the assembled sheets 24a, 24b, and the tit-bearing ring 24c, may be unitized by heat and pressure applied through annular presser plates 25 brought to bear against their marginal edge portions to thereby form of them a single hollow plate having integrally associated in its edge the tit member 24d, through which glycerine, oil or like refractive liquid is introduced to fill the hollow of the lens. As will be apparent, the sheet-like members 24a and 24b are optically flat and of uniform thickness, and when the circular lens 24 is mounted in the circular lens channel 23 and further liquid is forced into the lens through the tit 24d, a degree of convexity is imparted to the flexible lens walls depending upon the quantity of liquid introduced.

With a lens 24 having a diameter of approximately 40 millimeters a change of 1.0 diopter in the strength of the lens may be imparted by the introduction of approximately 0.2 cc. of liquid per lens, or 0.4 cc. for two lenses. The maximum diopters required to be added to the basic prescription for various ages of users to enable them to read matter as close as 9 to 12 inches, and the amount of oil or other refractive liquid thus required for full variation of the strength of the two lenses in the form of Figs. 1–10, are thus approximately as follows:

| Age | Max. diopters of + lens | Cc. of oil needed | Allowing small surplus |
| --- | --- | --- | --- |
| 45 | 1.0 | 0.4 | 0.6 |
| 50 | 2.0 | 0.8 | 1.0 |
| 55 | 2.5 | 1.0 | 1.2 |
| 60 | 2.5 | 1.0 | 1.2 |
| 65 up | 2.75 | 1.2 | 1.5 |

Still referring to the form of Figs. 1–10, and especially to Figs. 1 and 5, it will be seen that the webs 20d at the top of the spectacle afford a substantial depth of frame material thereat, in which channels 26 and 27 may be provided, connecting recesses 28 and 29 in the hinge ears with a central recess 30 in the bridge portion of the spectacles. In one of these channels (26 herein) there is inserted a fine tube 31, of metal or plastic for example, hermetically connected at its temple end (as is best shown in Figs. 8 and 9) with a passage 32 in one member of the temple bar hinge 33, this hinge being formed to provide a packed swivel coupling as hereinafter described. The other end of the tube 31 (see Figs. 1 and 5) is connected to a Y-shaped coupling 34 of rubber-like material, preferably an oil or glycerine-resistant synthetic rubber-like material such as that currently sold under the trade name "Neoprene," for example, into the legs of which are sealed the tits 24d of the variable diopter lenses 24. In the form shown, the Y-coupling 34 is also provided with a lateral passage member 35 having a puncture sealing end so that liquid may be introduced into and removed from the closed liquid system of the spectacle through a hollow needle or the like inserted through the self-sealing section 35.

As is best shown in Figs. 2, 8 and 9, the hinge 33, suitably secured to the frame as by riveting or the like is provided with counterbored annular channels 36 in two of its facing hinge sections, with which the passages 32 and 37, respectively, communicate. A perforated fiber washer or packing 38 (see Figs. 9 and 10) is embraced between the shoulders of these counterbored channels and establishes communication between them. The hinge sections 39 and 40 may be cut away on their under and upper sides respectively to allow for the assemblage of these parts, but preferably are not cut away and are bent into the position shown after the assembly of washer 38 in the channels 36. Suitable means is preferably provided for applying compression to tightly seal the swivel joint, in the form shown by threading the hinge pin 41 into the hinge member 39 and engaging its end with an abutment provided by the socket 42 of member 40.

The hinge passage 37 (see Figs. 2 and 8) has hermetically connected thereto, as by sweating or press fitting, a fine tubular member or tit 42 which receives the mouth of a collapsible reservoir or sac 43 (Figs. 2 and 3), which is housed in a recess 44 formed in the temple bar 45, and covered by the removable cover plate 46, which is secured in place in any suitable manner, as exemplified by hinge 47 and securing screw 48.

The sac 43 is provided with expanding and compressing means herein comprising a presser plate 49 adhesively secured to one side of the sac, and a coil spring 50 (see Fig. 2) bearing against the same. If desired the opposite side of the sac may be adhesively secured to the back wall of recess 44. Manual control means for adjusting the compressing and expanding means is inconspicuously and conveniently mounted in the temple bar in this form, and comprises a threaded pin 51 secured in the temple bar and a knurled nut 52 running thereon, and having its edge projecting through a slot in the under side of the temple bar 45. With this arrangement rotation of the nut 52 with the thumb causes it to transverse the pin 51 advancing the presser plate 49 against the action of the spring 50 and collapsing the sac 43, thus forcing into the lenses 24 an amount of liquid dependent upon the degree of rotation imparted to the nut and increasing their strength accordingly. On reverse rotation of the nut 52 the spring 50 and plate 49 cause the sac 43 to expand and withdraw liquid from the lenses 24 thus decreasing their diopter value.

As is best shown in Figs. 2 and 4, the spring 50 and pin 51 are embraced by the sac 43, and to prevent pinching of the sac the plate 49 is provided with a tubular boss 53 extending between the sac 43 and spring 50. The sac 43 in the form shown has a narrowed offset portion 43a embracing the boss 53 and extending beyond the edge of the presser plate 49 into an undercut recess 45a formed in the adjacent wall of the temple bar 45. Thus communication is assured between the two halves of the sac 43 during all stages of compression thereof. The knurled nut 52, in the form shown, is provided with a small rounded knob 54 at one point on its periphery, and runs freely on the screw 51 until it comes into bearing with the plate 49. By rotating the nut a predetermined number of turns (say three in the case of a particular user) after it bears against the plate 49, as indicated by the corresponding number of contacts of the knob 54 with the thumb, the user may quickly change from "distance" to "reading" settings of the lens without depending upon visional effect to guide his selection of the "reading" position.

In assembling the form of the invention shown in Figs. 1 through 10, the temple bars and hinge members, one of them carrying the tube 31 and tit 42, are assembled to the frame section 20a. The basic prescription lenses are then mounted in their mounting channels in the usual way and cleaned if necessary. The collapsible reservoir 43 with its compressing and expanding means 49—50 and its control means 51, 52, and cover 46 are then assembled. The Y-coupling 34 is then sealed to the tube 31 and to the lens tits 24d, and the lenses 24, suitably cleaned, are inserted in their channels 23. The subsequent insertion of the double snap-in bezel or frame section 20b serves to hold all these parts in their assembled portion.

As a part of the lens inserting steps, it is preferred to seal the lenses in their channels by the employment of a thin coating of rubber cement or other sealing composition. The spaces between the lenses 22 and 24 are thus sealed except for small breather passages, exemplified at 55 (Figs. 1 and 5) establishing communication with a desiccant chamber, which may be the same chamber 30 in which the coupling 34 is housed. In such case a small body or sac of desiccant, as activated silica gel, is packed into the space 30 before insertion of the cover member 20b. The communication to chamber 30 from the inter-lens spaces past the rear faces of the webs 20d, and via channels 26 and 27 may be relied on, if desired.

Suitable communication is established from the desiccant chamber to the outside atmosphere, the duct 27 (Fig. 1) being employed for this purpose, if desired. The housing of the desiccant in the frame may also be accomplished by employing at 29, Fig. 1, a packed hinge joint like that of Fig. 9, together with a hollow temple bar similar to that of Fig. 2, but preferably provided with a breather orifice extending to its outside surface. The desiccant may then be housed in the hollow temple bar and may supply desiccated air to the space between the lenses through the duct 27—29. In such case care is taken to seal all joints communicating with the duct system to insure that no breathing occurs except through the desiccating chamber. The deposition of dust or moisture in the space between the lenses is thus avoided. The assembly being completed except for insertion of the cover plate 20b, and all joints in the liquid system having been suitably sealed, the refractive liquid is introduced to the system, as by way of a hollow needle inserted into the self-sealing passage 35, Fig. 1. By causing fluctuation of the pressure in the sac and lens system relative to that of the fluid supply connected through the filling needle, while varying the orientation of the spectacle, the air may be milked from the system and the liquid filling may be controlled to impart to the lens the proper setting for "distance" vision when the sac 43 is fully expanded.

If desired the basic prescription lenses 22 may be ground to a spherical value slightly less than that actually required, as to a value equal to the basic prescription less ½ diopter, and the variable diopter lens may then be adjusted to a corresponding plus value for the "distance" vision setting, affording an adjustable end point at the distance end of the scale.

In the embodiment shown in Figs. 11 and 12, a combined basic prescription and variable diopter lens is employed, eliminating any air space such as that between the lenses 22 and 24 of Figs. 1–10.

In this form the individual variable diopter lens or lenses are separately controlled. The packed hinge conduit is also dispensed with, as is the requirement for sealing of frame channels. This form, however, does not sacrifice the advantage of manual control from the temple region, outside the temporal field of vision of the spectacle.

In the form of Fig. 11, the basic prescription lens 60, appropriately ground, a tit-carrying spacer member 61, and a single sheet of the flexible transparent material 62 are peripherally shaped to fit the frame aperture. The frame aperture, as in the case of the channel 21 of Fig. 1, may be non-circular in shape. In this case the flexible member 62 is formed of relatively thick material, say .02 to .03 inch in thickness, and is thinned at its central portion 63 in a circular area concentric with the occular axis of the spectacle, say to a thickness of .01 to .015 inch or less. The elements 60, 61 and 62 are then assembled, as in a jig, with a sealing compound or cement 64 interposed between their edges if desired, and are framed with a unitizing rim 65. The rim 65 is preferably of thermosetting plastic having a relatively high temperature coefficient of expansion and a fairly high elasticity so that after it is heat molded in place it shrinks tightly on the assembly and makes a permanently tight seal, through which only the tit member 66 extends.

With this assembly, which in the form shown may have a thinned area 63 of a diameter of say two centimeters (compared to a full lens diameter of say 4½ centimeters in the form of Fig. 1), the outer surface of the flexible lens member 63 may be continuous and the thinning may be effected at its inner face, as shown. With this construction care is preferably taken to select a plastic lens composition and a refractive filling liquid of substantially the same refractive index so as to render practically invisible the line of demarcation between the thinned section 63 and the thicker surrounding portions of the member 62.

Since the quantity of liquid necessary to effect the desired change in diopter value of the variable diopter lens varies approximately as the fourth power of its diameter, this construction reduces greatly the size of liquid reservoir necessary to afford the full range of adjustment desired. This reduced sized reservoir as shown in Fig. 11, may comprise a rubber-like sac 67 sufficiently small to be housed, with its compressing and expanding means, in a recess in the temple ear of the spectacle without any unsightly increase in its height or thickness as compared with the temple ear of ordinary heavy horn-rimmed spectacles currently in vogue. The sac 67, as shown, is preferably provided with a puncture-sealing section 67a and is secured on tit 66 by a suitable adhesive or cement.

The compressing and expanding means, in the form shown, comprises a presser plate 68, adhesively secured to the side of the sac 67 opposite its self-sealing section 67a, and a two pronged spring wire yoke 69, shown in detail in Fig. 13, the ends of which are secured to the plate 69, for example, by inserting them under lugs 70 which may be upset from the edges of the plate 68. If desired, a similar plate, adhesively secured to the back of the sac 67a may be similarly attached to the loop-section of the spring wire 69, such plate, if used in the arrangement shown, being provided with an aperture aligned with the aperture 91, hereinafter described.

In the form of Fig. 11, the spectacle frame 71, which may be constructed to mount the lens or lenses in any suitable way, is formed of a main lens-mounting section 71a and is provided with snap-in means 71b. In this embodiment the snap-in means is not continuous over the two lens openings and the intervening bridge, as is the case of Fig. 1, but has a simple ring shape to conform to the lens opening and to define with the member 71a the lens receiving channel. Any suitable retaining means may be employed, that shown comprising a snap ring 71c cooperating with a groove formed in the member 71a. The main frame member, adjacent its hinge ear section is provided with an opening 72 leading into the hinge ear recess 73, and of a size to admit to the recess the sac 67 and its compressing and expanding means 68, 69. Thus to mount the lens and reservoir assembly in this embodiment it is only necessary to insert the reservoir and its associated parts into the hinge ear from the lens opening, to seat the lens in the opening, and to then snap into place the ring 71b.

Only half a spectacle is shown in Fig. 11. The other half spectacle may be a mirror image or modified version of the half shown, or may take any other desired form. In the case of spectacles for a one-eyed person only one lens need be controlled, the other may be simply a dummy lens, with no variable diopter feature. In the form of Fig. 11, the high temple style is preferably adopted for the spectacle, as this provides a larger hinge ear without being conspicuous.

Referring further to Figs. 11 and 12, the manual control means for operating the reservoir collapsing and expanding means is preferably located in an inconspicuous and convenient manner and outside the temporal field of vision of the spectacle. Thus obscuring of the user's field of vision during manual adjustment of the expansible lens is obviated.

As shown in Figs. 11 and 12 the spectacle is provided with a temple bar 80 somewhat widened at its hinged end. This widening, being behind the temple ear, is inconspicuous and at a location at which no inconvenience results. The widened end of the temple bar is provided with an obliquely directed longitudinal passage 81 opening at the end of the bar which contacts the temple ear and merging at its other end with a slot 82 formed in the under side of the temple bar an inch or two from the temple ear. A bifurcated spring wire slide 83 is inserted crotch-first through slot 82 and passage 81 so that its crotch or nose end extends from the hinge ear contacting end of the temple bar. The opposite end of the bifurcated slide has a laterally extending end portion which projects through the slot 82 and terminates in a knurled tactile plate 84, which may be engaged by the user's thumb or fingers to advance and retract the slide. As shown in Fig. 11, the hinge ear portion of the frame, enclosing the sac 67, is provided with a rearwardly facing opening 85, through which the nose of the slide operator 83 extends when the temple bar 80 is in the position there shown. Advance of the slide 83 by the user thus pushes against the presser plate 68 collapsing the sac 67 accordingly, and expanding the thin portion 63 of the variable diopter lens to the position indicated, in an exaggerated manner, by the dotted lines at 63a.

The frictional contact of the spring slide 83 against the walls of the passage 81 (see Fig. 12) tends to retain it in adjusted position. The oblique direction of projection of the slide against the plate 68 (in Fig. 11) does likewise. Further means may be employed to retain the slide in its adjusted position, exemplified in Fig. 12 by the serration of the slide wire at 86 to provide it with notches engageable, when the spring slide is expanded, with a projection or detent, conveniently provided by the tip of the screw 87. With this arrangement pressure of the thumb on the tactile member 84 compresses the spring slide 86 for easy sliding, and release of 84 engages the slide retaining detent to hold the parts adjusted.

In the form of Fig. 12 stop means is also provided to determine quickly the proper adjustments for distance vision and for reading, in the form of two bifurcated plates 88 and 89 adjustably secured under the screw 87 and providing shoulders 88a and 89a which engage a projecting lug 90 on the under surface of the finger piece 84, in the depressed position thereof, at each end of this range of adjustment. Thus a single flick of the slide for each eye may adjust from one of these positions to the other, while release of inward pressure on the member 84 enables it to be further advanced for still closer vision, if desired.

The hollow between the lenses 60 and 62—63, and the communicating sac 67, is preferably filled with refractive liquid after assembly of the sac on the tit 66. This filling may be effected before insertion of the lens and sac assembly in the frame by insertion of a hollow needle through the self-sealing wall 67a of sac 67 and producing variation of pressure to extract air from and force liquid into the assembly. Preferably however, this filling is effected after insertion of the assembly into the frame by insertion of the hollow needle through an appropriately positioned orifice 91 properly located in the temple ear.

Even though a relatively small area 63 be thinned in this embodiment of the invention, as this thinned portion is aligned with the sight axis of the user through the axis of lens 60, and is close to the pupil where the cone of vision is narrow, an entirely satisfactory adjustment of the range of vision is obtained.

With this form of the invention, the folding of the temple bars releases the pressure on the sac 67 while maintaining the last set adjustment of the slide, and return of the temple bars to operative position restores the last used adjustment.

In both the illustrative forms of the invention the plastic lens is protected from injury by the basic prescription lens on the one side and by the temple bars on the other.

The invention is not limited to the embodiment shown to illustrate its principles, and various features of the invention may be incorporated in modified form and in embodiments omitting other features.

I claim:

1. Polyfocal spectacles comprising a frame having lens channel means, liquid expansible variable diopter lens means mounted therein, said frame further comprising temple bar means, said frame and its temple bar means being hollowed, and being hinged together, a compressible liquid reservoir separate from said lens, a duct connecting the same with said liquid expansible lens and digitally adjustable means for compressing said reservoir, said duct and reservoir being entirely housed in said frame, and said adjusting means being movably mounted in said temple bar in position to move against and compress said reservoir, said adjusting means having a tactile portion projecting from said temple bar and manipulable by the fingers of the wearer while the spectacle is being worn.

2. Polyfocal spectacles according to claim 1 further characterized in that the reservoir is located in the temple bar, in that said duct passes therefrom through a liquid tight joint in the hinged connection to said liquid expansible lens means, and in that said adjustable reservoir-compressing means is housed in said temple bar with the tactile portion thereof extending from the inner lower side thereof.

3. Polyfocal spectacles according to claim 1 further characterized in that the temple ear of the spectacle frame is hollow and in that said reservoir and a portion of the compressing means is housed in said hollow temple ear, and further characterized in that another portion of said compressing means, comprising the tactile part thereof is housed in the hollow of said temple bar and projects therefrom, and in that said other portion comprises an element projectable past said hinged connection to engage with and operate the first-named portion of said compressing means.

BENJAMIN F. EDWARDS.

REFERENCES CITED

The following references are of record in the file of this patent:

UNITED STATES PATENTS

| Number | Name | Date |
|---|---|---|
| 968,401 | Pelterie | Aug. 23, 1910 |
| 1,269,422 | Gordon | June 11, 1918 |
| 1,515,389 | Hopkins | Nov. 11, 1924 |

FOREIGN PATENTS

| Number | Country | Date |
|---|---|---|
| 435,332 | France | Dec. 21, 1911 |
| 258,325 | Great Britain | Sept. 15, 1926 |
| 622,615 | France | Feb. 28, 1927 |
| 757,055 | France | Oct. 2, 1933 |
| 466,034 | Great Britain | May 20, 1937 |
| 840,622 | France | Jan. 23, 1939 |
| 241,951 | Switzerland | Apr. 15, 1946 |